Figure 4:
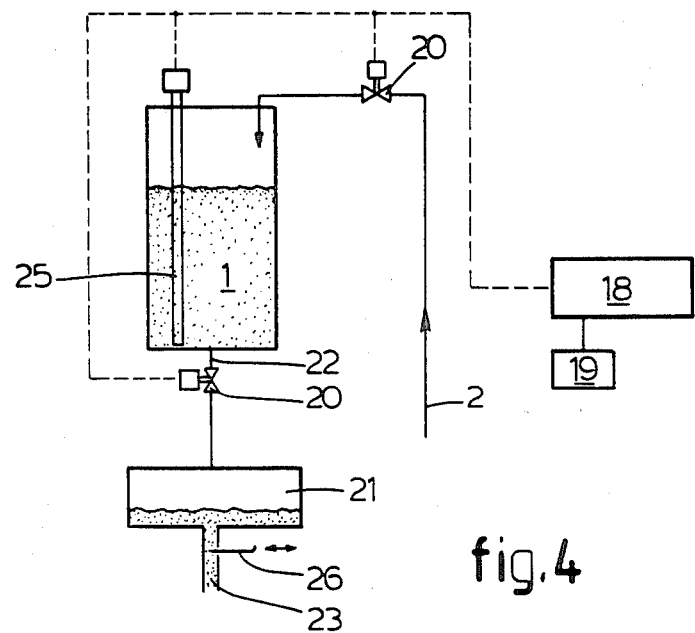

United States Patent [19]

Jongerius

[11] Patent Number: 4,720,024
[45] Date of Patent: Jan. 19, 1988

[54] MEASURING DEVICE FOR AN APPARATUS FOR MEASURING AND DELIVERING PREDETERMINED QUANTITIES OF LIQUID, FOR EXAMPLE QUANTITIES OF WATER

[75] Inventor: Sebastiaan C. E. Jongerius, Renswoude, Netherlands

[73] Assignee: Jongerius Hanco B.V., Netherlands

[21] Appl. No.: 834,752

[22] Filed: Feb. 28, 1986

Related U.S. Application Data

[63] Continuation-in-part of Ser. No. 684,459, Dec. 21, 1984, abandoned.

[51] Int. Cl.⁴ .............................................. B67D 5/30
[52] U.S. Cl. ........................................ 222/14; 222/56; 141/198
[58] Field of Search ................. 222/26, 67, 64, 55, 222/56, 52, 20, 17, 14; 73/321, 313, 305; 141/196; 137/571, 575, 8

[56] References Cited

U.S. PATENT DOCUMENTS

| | | | |
|---|---|---|---|
| 2,542,239 | 2/1951 | Engels et al. | 222/64 |
| 3,133,726 | 5/1964 | Tarukawa | 222/56 |
| 3,891,123 | 6/1975 | Blackburn | 222/64 |
| 3,935,970 | 2/1976 | Spaw | 222/64 |
| 3,998,686 | 12/1976 | Meiling et al. | 222/56 |
| 4,065,968 | 1/1978 | Sunagawa | 73/321 |
| 4,244,219 | 1/1981 | Takahashi | 73/313 |
| 4,284,210 | 8/1981 | Holak | 222/14 |
| 4,291,575 | 9/1981 | Frissora | 222/64 |
| 4,440,315 | 4/1984 | Slobodnik | 222/56 |
| 4,458,827 | 7/1984 | Stelte | 222/63 |

FOREIGN PATENT DOCUMENTS 248991  7/1970  U.S.S.R. .............................. 222/64

Primary Examiner—Joseph J. Rolla
Assistant Examiner—Kenneth Noland
Attorney, Agent, or Firm—Lorusso & Loud

[57] ABSTRACT

A measuring device for an apparatus for measuring and delivering predetermined quantities of liquid, for example quantities of water, comprises a measuring vessel, to which a liquid supply pipe and a liquid discharge pipe are connected, measuring apparatus being mounted in the measuring vessel, which measuring apparatus serve for measuring a fixed quantity of liquid in the measuring vessel and for controlling the liquid supply to and the liquid discharge from the measuring vessel and the measuring apparatus further causes the liquid supply pipe to close and the liquid discharge pipe to open when a set residual quantity of liquid is supplied in the measuring vessel.

14 Claims, 4 Drawing Figures

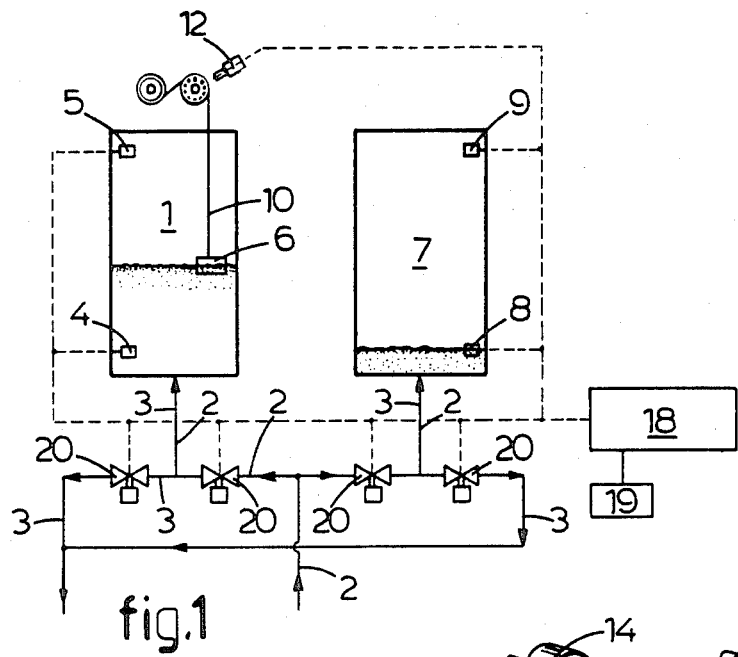
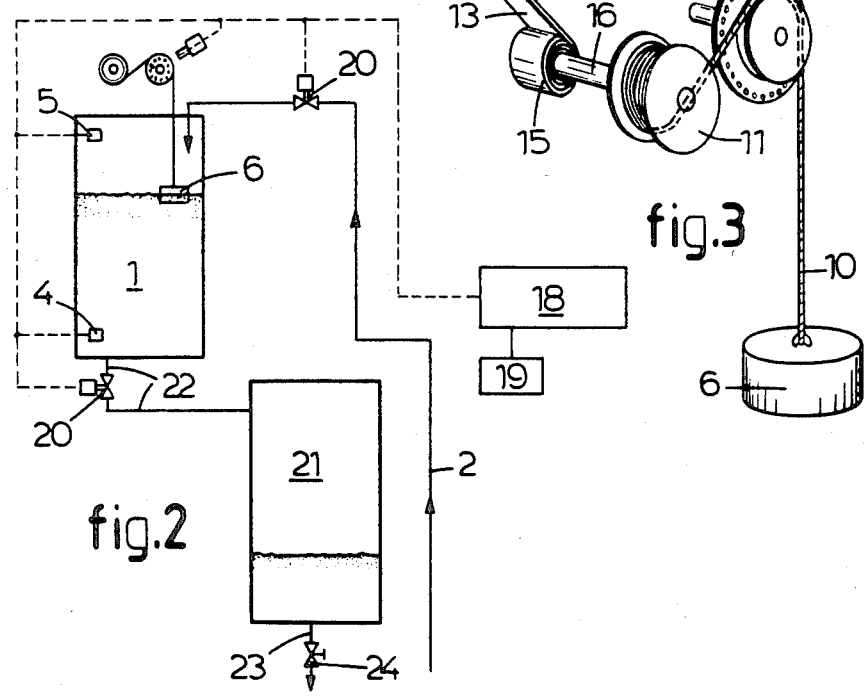

MEASURING DEVICE FOR AN APPARATUS FOR MEASURING AND DELIVERING PREDETERMINED QUANTITIES OF LIQUID, FOR EXAMPLE QUANTITIES OF WATER

This application is a CIP of Ser. No. 684,459 filed on Dec. 21, 1984, now abandoned.

The invention relates to a measuring device for an apparatus for measuring and delivering predetermined quantities of liquid, for example quantities of water, this measuring device comprising a measuring vessel, to which a liquid supply pipe and a liquid discharge pipe are connected.

An apparatus of this kind is already known, which for example serves for delivering a predetermined quantity of water with a required temperature as a water charge for a dough tub in a bakery.

The measuring device for this known apparatus comprises a measuring vessel, to which the quantity of water necessary for a charge, is supplied through supply pipes for hot and cold water, which supply pipes alternately deliver hot water and cold water in the measuring vessel and are connected to a water pipe, which debouches in the vicinity of the bottom of the measuring vessel. Valves are accommodated in the water supply pipes, which valves may be operated by means of a thermostat, which communicates with a temperature feeler means in the measuring vessel, which on the one hand feels the temperature of the surrounding water in the measuring vessel and on the other hand feels the temperature of the water supplied to the measuring vessel and which controls the changing over of the thermostat before the temperature of the surrounding water in the measuring vessel has reached the required temperature.

This known measuring device has operated satisfactorily in practice, but is rather voluminous as the contents of the measuring vessel has to be equally large as the maximum quantity of liquid necessary for a charge, which may for example amount to 1000 liters.

It is an object of the present invention to provide a measuring device for an apparatus for measuring and delivering predetermined quantities of liquid, for example quantities of water, which measuring device requires considerably less space.

For this purpose the measuring device according to the invention is characterized in that measuring means are mounted in the measuring vessel, which measuring means serve for measuring a fixed quantity of liquid in the measuring vessel and for controlling the liquid supply to and the liquid discharge from the measuring vessel, while the measuring means further causes the liquid supply pipe to close and the liquid discharge pipe to open when a set residual quantity of liquid is supplied in the measuring vessel.

According to the invention it is possible to use a small measuring vessel of for example 25 liters, which, dependent on the quantity of liquid required for a charge, can be filled a number of times with the fixed quantity of liquid and subsequently can be emptied, whereafter the measuring means controls that the required residual quantity of liquid is supplied to the measuring vessel and is thereafter delivered by the measuring vessel.

In a particular favourable embodiment of the invention this measuring device comprises at least one more measuring vessel, which is provided with a measuring means, which serve for measuring a fixed quantity of liquid in this further measuring vessel.

By the application of a plurality of measuring vessels a predetermined quantity of liquid can be delivered very quickly, in particular when the liquid supply to and the liquid discharge from these measuring vessels are controlled in such a way, that always one measuring vessel is filled, while another measuring vessel is emptied.

According to a preferred embodiment the measuring device may comprise a further vessel, which is located at a lower level than the first mentioned measuring vessel and which is connected with the first mentioned measuring vessel by means of a connecting pipe, in which a valve is accommodated, which valve opens when the liquid level in the first mentioned measuring vessel reaches the height which is determined by the upper stationary measuring means or by the displaceable measuring means respectively, while this valve closes when the liquid level in the first mentioned measuring vessel has fallen until the lower stationary measuring means is reached, the further vessel being provided with a liquid discharge in which a sliding valve may be accommodated.

In this manner an uninterrupted liquid discharge from the further vessel may be obtained, when the sliding valve is set in such a way, that this further vessel cannot become empty before liquid is supplied again to the further vessel from the first mentioned measuring vessel.

The advantage of this alternative embodiment is that less valves are necessary, so that this measuring device can be manufactured at less cost. Of course in this embodiment the discharge speed of the liquid from the further vessel is slower than the discharge speed of the preceding embodiment.

Preferably the further vessel has a volume which is less than the volume of the measuring vessel. In this way the dimensions of the measuring device can be further reduced without affecting the proper operation of the device.

In a favourable embodiment of the invention the volume of the further vessel in relation to the diameter of the connecting pipe between the measuring vessel and the further vessel and the liquid discharge of the further vessel is chosen such, that the discharge time of the maximum liquid volume of the further vessel is substantially equal to the supply time of the maximum liquid volume of the measuring vessel.

The invention will hereafter be elucidated with reference to the drawing, which shows three embodiments by way of example of the measuring device according to the invention for an apparatus for measuring and delivering predetermined quantities of liquid, for example quantities of water.

FIG. 1 schematically shows a first embodiment of a measuring device according to the invention for an apparatus for measuring and delivering predetermined quantities of liquid, for example quantities of water.

FIG. 2 schematically shows a second embodiment of the measuring device according to the invention.

FIG. 3 is a perspective view of a detail of the measuring device according to FIGS. 1 and 2.

FIG. 4 schematically shows a third embodiment of the measuring device according to the invention.

FIG. 1 shows a first embodiment of a measuring device for an apparatus for measuring and delivering predetermined quantities of liquid, e.g. quantities of water.

This measuring device comprises a first measuring vessel 1, to which a liquid supply pipe 2 and a liquid discharge pipe 3 are connected.

As appears from FIG. 1 the supply pipe 2 and the discharge pipe 3 have a common pipe part, which leads to the measuring vessel 1.

A lower and an upper stationary measuring means 4 and 5 respectively are accommodated in the measuring vessel 1, which measuring means serve for measuring a fixed quantity of liquid in the measuring vessel 1 and which may each consist of a level switch. The measuring vessel 1 further comprises a displaceable measuring means, which in both embodiments comprises a float 6 and which serves for measuring an adjustable residual quantity of liquid in the measuring vessel 1.

The measuring device according to FIG. 1 further comprises a second measuring vessel 7, which is also provided with a lower and an upper measuring means 8 and 9 respectively, which serve for measuring a fixed quantity of liquid in this measuring vessel 7 and which may again consist of level switches. Preferably the measuring vessels 1 and 7 are arranged for delivering an equal fixed quantity of liquid.

The displaceable measuring means applied in both embodiments is shown more in detail in FIG. 3.

The float 6 is suspended from the cable 10. The end of this cable, which is remote from the float 6 may be wound on a winding reel 11, which is subjected to a constant winding moment, while a detector 12 reads the position of the float 6.

The constant winding moment is exerted on the winding reel 11 by a spring 13, which comprises parts 14, 15 wound in opposite directions and which engages a shaft 16, on which the winding reel 11 is mounted.

The cable 10 drives a counting roller 17, which has a plurality of holes, which counting roller is scanned by the detector 12, which e.g. consists of a photo-electric cell.

The measuring means 4, 5, 8, 9 and 12 emit signals to a microprocessor 18, which indicates on a digital indicator 19 the number of liters required for a certain liquid charge, e.g. 85 liters.

The microprocessor 18 divides this volume by the contents of the measuring vessels 1, 7 determined by the stationary measuring means 4, 5 and 8, 9 which contents e.g. amounts to 25 liters and further computes the residual quantity, in the present case 10 liters.

Hereupon the microprocessor 18 determines which measuring vessel, 1 or 7, is first filled and emptied, in the present case the measuring vessel 7, whereafter the microprocessor 18 controls magnet valves 20 in the liquid supply pipes 2 and in the liquid discharge pipes 3 in such a way, that first the measuring vessel 7 with the fixed liquid quantity of 25 liters is filled, whereby the liquid level in the measuring vessel 7 reaches the upper stationary measuring means 9, while thereafter this liquid quantity is delivered again, whereby the liquid level in the measuring vessel 7 falls until the lower measuring means 8 is reached, whilst simultaneously with the discharge of liquid from the measuring vessel 7 the measuring vessel 1 is filled with the fixed liquid quantity of 25 liters.

During the discharge of this liquid quantity from the measuring vessel 1 the measuring vessel 7 is filled for the second time with the fixed liquid quantity of 25 liters, whereby during the discharge of this liquid quantity from the measuring vessel 7 the residual quantity of 10 liters is supplied to the measuring vessel 1, whereby the detector 12 emits a signal to the microprocessor 18 when this residual quantity is supplied into the measuring vessel 1.

After the liquid supply from the measuring vessel 7 has ended, the residual quantity of 10 liters is discharged from the first measuring vessel 1, whereafter the quantity of liquid of 85 liters for a charge, is obtained.

The liquid discharge from both measuring vessels 1, 7 can take place uninterruptedly and uniformly by the accommodation of throttle valves in the liquid discharge pipes 3, which take care that the filling time and the emptying time of the measuring vessels 1, 7 are exactly the same.

Further, the program of the microprocessor 18 may be provided with the possibility of introducing a multiplying factor, with which deviating dimensions of the measuring vessels can be compensated for, or with which liters of liquid with a certain specific weight may be conversed into kilogrammes. Also a compensation factor for the different liquid weights at various temperatures can be introduced.

FIG. 2 shows a modified embodiment of the measuring device for an apparatus for measuring and delivering predetermined quantities of liquid, e.g. quantities of water.

This measuring device is again provided with a measuring vessel 1 having a liquid supply pipe 2, in which a magnet valve 20 is accommodated, and a liquid discharge pipe 3, which also comprises a magnet valve 20.

Again a lower and an upper stationary measuring means 4 and 5 respectively are accommodated in the measuring vessel 1, which measuring means may emit signals to a microprocessor 18, which is provided with a digital indicator 19. The measuring vessel 1 also comprises a displaceable measuring means, which is constructed in the manner as shown in FIG. 3 and which comprises a float 6.

The measuring device according to FIG. 2 is further provided with a vessel 21, which is located at a lower level than the measuring vessel 1 and which is as large as the measuring vessel 1. The measuring vessel 21 is connected with the measuring vessel 1 by means of a liquid discharge pipe 22, through which the liquid of the measuring vessel 1 can flow to the vessel 21. The magnet valve 20 in this liquid discharge pipe 22 is controlled from the microprocessor 18 in such a way that this magnet valve 20 opens when the liquid level in the measuring vessel 1 is reached, which is determined by the upper stationary measuring means 5 or by the detector 12 and the float 6, while this magnet valve 20 closes when the liquid level in the measuring vessel 1 has fallen until the lower stationary measuring means 4 is reached.

The vessel 21 is provided with a liquid discharge 23 in which a throttle valve 24 is accommodated, which is set in such a manner that the sum of the supply time and the discharge time of a liquid unit—such as 1 liter—to and from the measuring vessel 1 is approximately equal to the time which is necessary for discharging this liquid volume unit from the measuring vessel 21.

In this manner it is obtained that the vessel 21 can never be empty before the measuring vessel 1 delivers liquid to the vessel 21 by opening the magnet valve 20 in the liquid discharge pipe 22, which magnet valve is controlled by the microprocessor 18.

Therefore, in the embodiment according to FIG. 2 an uninterrupted liquid discharge is again realized.

As appears from a comparison of FIGS. 1 and 2, the embodiment according to FIG. 2 requires considerably less magnet valves 20 than the embodiment according to FIG. 1, so that the embodiment according to FIG. 2 can be manufactured at less cost.

FIG. 4 shows a third embodiment of the measuring device, which substantially corresponds to the embodiment of FIG. 2. However, in this third embodiment the measuring vessel comprises a measuring means 25, which may consist of a level probe or a pressure transducer, in which the functions of the stationary and displaceable measuring means 4, 5, 6 of FIG. 1-3 are combined. Since the level probe or pressure transducer has no movable parts the reliability of the device is further improved.

The vessel 21 has a volume which is less than the volume of the measuring vessel 1. Preferably the volume of the vessel 21 in relation to the diameter of the connecting pipe 22 between the measuring vessel 1 and the vessel 21 and the liquid discharge pipe 22 is chosen such, that at the discharge of the measuring vessel 1 the vessel 21 is just completely filled when the level in the measuring vessel 1 has reached the lower height, whereby the magnet valve 20 in the connecting pipe 22 closes and the magnet valve 20 in the supply pipe 2 opens. At this time the supply of liquid to the measuring vessel 1 is started. The discharge time of the maximum liquid volume of the vessel 22 is substantially equal to the supply time of the maximum liquid volume of the measuring vessel 1. By means of a sliding valve 26 in the liquid discharge pipe 23 the velocity of the liquid discharge from the vessel 21 may be adjusted.

The invention is not restricted to the embodiments shown in the drawing by way of example, which may be varied in several ways within the scope of the appended claims.

I claim:

1. A measuring devie for measuring and delivering any predetermined quantity of liquid as a continuous flow, said measuring device comprising:
   a first single measuring vessel of a volume less than said predetermined quantity;
   a liquid supply pipe connected to said first single measuring vessel;
   a second single vessel for discharging said predetermined quantity of liquid as a continuous stream through a discharge valve and arranged at a lower level than said first single measuring vessel, said second single vessel receiving liquid solely from said single measuring vessel and having a capacity less than said first predetermined amount;
   a connecting pipe connecting said single measuring vessel to said second single vessel;
   measuring means, mounted within said first single measuring vessel, for measuring a fixed quantity of liquid in said first single measuring vessel and for measuring any residual quantity of liquid equal to the difference between said predetermined amount and some multiple of said fixed amount;
   a first valve, accomodated in said supply pipe, said first valve opening and closing responsive to said measuring means; and
   a second valve, accomodated in said connecting pipe and operating responsive to said measuring means, said second valve opening when the liquid level in said first single measuring vessel reaches an upper level, as detected by said measuring means, and closing when the liquid level has fallen to a lower level, as detected by said measuring means; and the discharge valve of the second single vessel is set in such a way that the second single vessel cannot become empty before liquid is supplied again to the second single vessel from the first single measuring vessel.

2. Measuring device according to claim 1, wherein said second single vessel has a volume which is less than the volume of said first single measuring vessel.

3. Measuring device according to claim 1, wherein a volume of said second single vessel in relation to the diameter of said connecting pipe between said first single measuring vessel and said second single vessel and the liquid discharge of said second single vessel is chosen such, that the discharge time of the maximum liquid volume of said second single vessel is substantially equal to the supply time of the maximum liquid volume of said first single measuring vessel.

4. Measuring device according to claim 1, wherein the measuring means comprises a pressure transducer or a level probe, with which the level in the measuring vessel may be continuously measured.

5. A measuring device according to claim 1, wherein said measuring means comprises stationary lower and upper measuring means for measuring said first fixed quantity of liquid in said single measuring vessel and a displaceable measuring means for measuring said residual quantity of liquid.

6. Measuring device according to claim 5, wherein the displaceable measuring means comprises a float, which is suspended from a cable, the cable end, which is remote from the float being wound on a winding reel, which is subjected to a constant winding moment, a detector reading the position of the float.

7. Measuring device according to claim 6 wherein the constant winding moment on the winding reel is exerted by a spring which comprises parts which are wound in opposite directions.

8. Measuring device according to claim 7, wherein the cable drives a counting roller, which is scanned by the detector, such as a photo-electric cell.

9. A measuring device according to claim 5 wherein each of said upper and lower measuring means are level switches.

10. A measuring device according to claim 5 wherein each of said upper and lower measuring means is a pressure transducer or level probe.

11. A measuring device in accordance with claim 5 further comprising a microprocessor which computes said residual amount and which receives signals from said stationary lower and upper measuring means and from said displaceable measuring means, said microporcessor controlling said first and second valves to discharge said predetermined amount of liquid from said second single vessel as a continuous stream.

12. A measuring device according to claim 1, wherein the liquid supply to and the liquid discharge from the measuring vessels are adapted in such a way that one measuring vessel is always filling, while another measuring vessel is always emptying.

13. A measuring device in accordance with claim 1 wherein the sum of (1) the time required to supply a unit volume of liquid to said first single measuring vessel and (2) the time required to discharge said unit volume from said first single measuring vessel is substantially equal to the time required to discharge said unit volume from said second single vessel.

14. A measuring device according to claim 1 further comprising a slide valve for controlling the discharge from said second single vessel.

* * * * *